(12) United States Patent
Wouhaybi et al.

(10) Patent No.: US 10,082,574 B2
(45) Date of Patent: Sep. 25, 2018

(54) SYSTEM, METHOD AND COMPUTER PROGRAM PRODUCT FOR HUMAN PRESENCE DETECTION BASED ON AUDIO

(75) Inventors: Rita H. Wouhaybi, Portland, OR (US); Mark D. Yarvis, Portland, OR (US); Sharad K. Garg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 13/994,770

(22) PCT Filed: Aug. 25, 2011

(86) PCT No.: PCT/US2011/049228
§ 371 (c)(1),
(2), (4) Date: Jun. 23, 2014

(87) PCT Pub. No.: WO2013/028204
PCT Pub. Date: Feb. 28, 2013

(65) Prior Publication Data
US 2014/0340992 A1    Nov. 20, 2014

(51) Int. Cl.
*G01S 15/04* (2006.01)
*H04N 21/422* (2011.01)
(Continued)

(52) U.S. Cl.
CPC ....... *G01S 15/04* (2013.01); *H04N 21/42203* (2013.01); *H04N 21/4394* (2013.01); *H04N 21/44218* (2013.01)

(58) Field of Classification Search
None
See application file for complete search history.

(56) References Cited

U.S. PATENT DOCUMENTS

| 4,769,697 A | 9/1988 | Gilley et al. |
| 5,515,098 A | 5/1996 | Cartes |

(Continued)

FOREIGN PATENT DOCUMENTS

| CN | 101159818 A | 4/2008 |
| CN | 102223393 A | 10/2011 |

(Continued)

OTHER PUBLICATIONS

Final Office Action received for U.S. Appl. No. 13/163,968, dated Aug. 16, 2012, 8 pages.
(Continued)

*Primary Examiner* — Quan-Zhen Wang
*Assistant Examiner* — Rajsheed Black-Childress
(74) *Attorney, Agent, or Firm* — Schwabe, Williamson & Wyatt, P.C.

(57) ABSTRACT

Methods, systems and computer program products that allow for the determination of human presence in a room where content is being presented. The audio that is associated with the content may be captured, along with the audio that is being generated collectively by whatever sources may be in the room including the presentation of the content. Features may be extracted from both the content audio and the room audio. These features may then be compared, and the differences may be quantified. If the differences are significant, then human presence may be inferred.

30 Claims, 13 Drawing Sheets

(51) Int. Cl.
*H04N 21/439* (2011.01)
*H04N 21/442* (2011.01)

(56) References Cited

U.S. PATENT DOCUMENTS

| | | |
|---|---|---|
| 5,644,723 A | 7/1997 | Deaton et al. |
| 5,661,516 A | 8/1997 | Carles |
| 5,911,773 A | 6/1999 | Mutsuga et al. |
| 6,334,110 B1 | 12/2001 | Walter et al. |
| 6,338,065 B1 | 1/2002 | Takahashi et al. |
| 6,401,034 B1 | 6/2002 | Kaplan et al. |
| 6,708,335 B1 | 3/2004 | Ozer et al. |
| 6,941,197 B1 | 9/2005 | Murakami et al. |
| 6,947,881 B1 | 9/2005 | Murakami et al. |
| 7,072,942 B1 | 7/2006 | Maller |
| 7,134,130 B1 | 11/2006 | Thomas |
| 7,231,198 B2 | 6/2007 | Loughran |
| 7,349,513 B2 | 3/2008 | Bhullar et al. |
| 7,363,151 B2 | 4/2008 | Nomura et al. |
| 7,366,683 B2 | 4/2008 | Altberg et al. |
| 7,457,828 B2 | 11/2008 | Wenner et al. |
| 7,546,619 B2 | 6/2009 | Anderson et al. |
| 7,567,800 B2 | 7/2009 | Uematsu et al. |
| 7,636,785 B2 | 12/2009 | Shahine et al. |
| 7,657,626 B1 | 2/2010 | Zwicky |
| 7,698,236 B2 | 4/2010 | Cox et al. |
| 7,730,509 B2 | 6/2010 | Boulet et al. |
| 7,761,345 B1 | 7/2010 | Martin et al. |
| 7,778,987 B2 | 8/2010 | Hawkins |
| 7,831,384 B2 | 9/2010 | Bill |
| 7,835,859 B2 | 11/2010 | Bill |
| 7,904,461 B2 | 3/2011 | Baluja et al. |
| 7,974,873 B2 | 7/2011 | Simmons et al. |
| 8,065,227 B1 | 11/2011 | Beckman |
| 8,108,405 B2 | 1/2012 | Marvit et al. |
| 8,307,068 B2 | 11/2012 | Schuler |
| 8,429,685 B2 | 4/2013 | Yarvis et al. |
| 8,515,828 B1 | 8/2013 | Wolf et al. |
| 8,527,336 B2 | 9/2013 | Kothari et al. |
| 2001/0049620 A1 | 12/2001 | Blasko |
| 2001/0056461 A1 | 12/2001 | Kampe et al. |
| 2002/0023002 A1 | 2/2002 | Staehelin |
| 2002/0023010 A1 | 2/2002 | Rittmaster et al. |
| 2002/0072952 A1 | 6/2002 | Hamzy et al. |
| 2002/0078444 A1 | 6/2002 | Krewin et al. |
| 2002/0129368 A1 | 9/2002 | Schlack et al. |
| 2002/0174025 A1 | 11/2002 | Hind et al. |
| 2002/0188609 A1 | 12/2002 | Fukuta et al. |
| 2003/0023678 A1 | 1/2003 | Rugelj |
| 2003/0037333 A1 | 2/2003 | Ghashghai et al. |
| 2003/0134632 A1 | 7/2003 | Loughran |
| 2003/0135499 A1 | 7/2003 | Schirmer et al. |
| 2003/0191812 A1 | 10/2003 | Agarwalla et al. |
| 2004/0003392 A1 | 1/2004 | Trajkovic et al. |
| 2004/0039629 A1 | 2/2004 | Hoffman et al. |
| 2004/0064443 A1 | 4/2004 | Taniguchi et al. |
| 2004/0133923 A1 | 7/2004 | Watson et al. |
| 2004/0205810 A1 | 10/2004 | Matheny et al. |
| 2004/0240676 A1 | 12/2004 | Hashimoto et al. |
| 2004/0254942 A1 | 12/2004 | Error et al. |
| 2005/0079343 A1 | 4/2005 | Raybould et al. |
| 2005/0097595 A1 | 5/2005 | Lipsanen et al. |
| 2005/0160002 A1 | 7/2005 | Roetter et al. |
| 2005/0216345 A1 | 9/2005 | Altberg et al. |
| 2005/0283699 A1 | 12/2005 | Nomura et al. |
| 2006/0015637 A1 | 1/2006 | Chung |
| 2006/0090131 A1 | 4/2006 | Kumagai |
| 2006/0090185 A1 | 4/2006 | Zito et al. |
| 2006/0106944 A1 | 5/2006 | Shahine et al. |
| 2006/0155608 A1 | 7/2006 | Bantz et al. |
| 2006/0184625 A1 | 8/2006 | Nordvik et al. |
| 2006/0212350 A1 | 9/2006 | Ellis et al. |
| 2006/0241862 A1 | 10/2006 | Ichihara et al. |
| 2006/0242315 A1 | 10/2006 | Nichols |
| 2006/0253453 A1 | 11/2006 | Chmaytelli et al. |
| 2006/0271425 A1 | 11/2006 | Goodman et al. |
| 2006/0282304 A1 | 12/2006 | Bedard et al. |
| 2007/0010942 A1 | 1/2007 | Bill |
| 2007/0073477 A1 | 3/2007 | Krumm et al. |
| 2007/0073682 A1 | 3/2007 | Adar et al. |
| 2007/0088801 A1 | 4/2007 | Levkovitz et al. |
| 2007/0106468 A1 | 5/2007 | Eichenbaum et al. |
| 2007/0121845 A1 | 5/2007 | Altberg et al. |
| 2007/0157262 A1 | 7/2007 | Ramaswamy et al. |
| 2007/0220010 A1 | 9/2007 | Ertugrul |
| 2007/0220146 A1 | 9/2007 | Suzuki |
| 2007/0226320 A1 | 9/2007 | Hager et al. |
| 2007/0239527 A1 | 10/2007 | Nazer et al. |
| 2007/0239533 A1 | 10/2007 | Wojcicki et al. |
| 2007/0255617 A1 | 11/2007 | Maurone et al. |
| 2007/0270163 A1 | 11/2007 | Anupam et al. |
| 2007/0294773 A1 | 12/2007 | Hydrie et al. |
| 2007/0299671 A1* | 12/2007 | McLachlan ............ G10L 17/26 704/500 |
| 2008/0021632 A1 | 1/2008 | Amano |
| 2008/0027639 A1 | 1/2008 | Tryon |
| 2008/0033841 A1 | 2/2008 | Wanker |
| 2008/0036591 A1 | 2/2008 | Ray |
| 2008/0040370 A1 | 2/2008 | Bosworth et al. |
| 2008/0040475 A1 | 2/2008 | Bosworth et al. |
| 2008/0052082 A1* | 2/2008 | Tsai ...................... G10L 15/26 704/275 |
| 2008/0052168 A1 | 2/2008 | Peters et al. |
| 2008/0086477 A1 | 4/2008 | Hawkins |
| 2008/0097822 A1 | 4/2008 | Schigel et al. |
| 2008/0104195 A1 | 5/2008 | Hawkins et al. |
| 2008/0114651 A1 | 5/2008 | Jain et al. |
| 2008/0120105 A1* | 5/2008 | Srinivasan ............. G10L 15/20 704/246 |
| 2008/0120308 A1 | 5/2008 | Martinez et al. |
| 2008/0134043 A1 | 6/2008 | Georgis et al. |
| 2008/0154720 A1 | 6/2008 | Gounares et al. |
| 2008/0162186 A1 | 7/2008 | Jones |
| 2008/0187114 A1 | 8/2008 | Altberg et al. |
| 2008/0201472 A1 | 8/2008 | Bistriceanu et al. |
| 2008/0215425 A1 | 9/2008 | Guldimann et al. |
| 2008/0221987 A1 | 9/2008 | Sundaresan et al. |
| 2008/0222283 A1 | 9/2008 | Ertugrul et al. |
| 2008/0235088 A1 | 9/2008 | Weyer et al. |
| 2008/0275899 A1 | 11/2008 | Baluja et al. |
| 2008/0290987 A1 | 11/2008 | Li |
| 2008/0306808 A1 | 12/2008 | Adjali et al. |
| 2009/0006995 A1 | 1/2009 | Error et al. |
| 2009/0049097 A1 | 2/2009 | Nocifera et al. |
| 2009/0091426 A1 | 4/2009 | Barnes et al. |
| 2009/0106415 A1 | 4/2009 | Brezina et al. |
| 2009/0172035 A1 | 7/2009 | Lessing et al. |
| 2009/0172721 A1 | 7/2009 | Lloyd et al. |
| 2009/0177528 A1 | 7/2009 | Wu et al. |
| 2009/0204706 A1 | 8/2009 | Ertugrul et al. |
| 2009/0216704 A1 | 8/2009 | Zheng et al. |
| 2009/0240569 A1 | 9/2009 | Ramer et al. |
| 2009/0307205 A1 | 12/2009 | Churchill et al. |
| 2009/0327486 A1 | 12/2009 | Andrews et al. |
| 2010/0031335 A1 | 2/2010 | Handler |
| 2010/0042317 A1 | 2/2010 | Tajima et al. |
| 2010/0049602 A1 | 2/2010 | Softky |
| 2010/0063877 A1 | 3/2010 | Soroca et al. |
| 2010/0076997 A1 | 3/2010 | Koike et al. |
| 2010/0082432 A1 | 4/2010 | Feng et al. |
| 2010/0094878 A1 | 4/2010 | Soroca et al. |
| 2010/0106603 A1 | 4/2010 | Dey et al. |
| 2010/0106673 A1 | 4/2010 | Parks |
| 2010/0114864 A1 | 5/2010 | Agam et al. |
| 2010/0161492 A1 | 6/2010 | Harvey et al. |
| 2010/0162285 A1* | 6/2010 | Cohen ................... H04H 60/31 725/12 |
| 2010/0220679 A1 | 9/2010 | Abraham et al. |
| 2010/0250361 A1 | 9/2010 | Torigoe et al. |
| 2010/0251304 A1 | 9/2010 | Donoghue et al. |
| 2010/0281042 A1 | 11/2010 | Windes et al. |
| 2010/0293048 A1 | 11/2010 | Singolda et al. |
| 2010/0299225 A1 | 11/2010 | Aarni et al. |
| 2010/0316218 A1 | 12/2010 | Hatakeyama et al. |

(56) References Cited

U.S. PATENT DOCUMENTS

| | | | |
|---|---|---|---|
| 2010/0325259 A1 | 12/2010 | Schuler | |
| 2010/0325655 A1 | 12/2010 | Perez | |
| 2011/0010433 A1 | 1/2011 | Wilburn et al. | |
| 2011/0072452 A1 | 3/2011 | Shimy et al. | |
| 2011/0078720 A1* | 3/2011 | Blanchard | H04N 7/165 725/25 |
| 2011/0106436 A1 | 5/2011 | Bill | |
| 2011/0137975 A1 | 6/2011 | Das et al. | |
| 2011/0154385 A1 | 6/2011 | Price et al. | |
| 2011/0161462 A1 | 6/2011 | Hussain et al. | |
| 2011/0213800 A1 | 9/2011 | Saros et al. | |
| 2011/0214148 A1 | 9/2011 | Gossweiler, III et al. | |
| 2011/0246213 A1 | 10/2011 | Yarvis et al. | |
| 2011/0246214 A1 | 10/2011 | Yarvis et al. | |
| 2011/0246283 A1 | 10/2011 | Yarvis et al. | |
| 2011/0246300 A1 | 10/2011 | Yarvis et al. | |
| 2011/0246469 A1 | 10/2011 | Yarvis et al. | |
| 2011/0247029 A1 | 10/2011 | Yarvis et al. | |
| 2011/0247030 A1 | 10/2011 | Yarvis et al. | |
| 2011/0251788 A1 | 10/2011 | Yarvis et al. | |
| 2011/0251918 A1 | 10/2011 | Yarvis et al. | |
| 2011/0251990 A1 | 10/2011 | Yarvis et al. | |
| 2011/0258203 A1 | 10/2011 | Wouhaybi et al. | |
| 2011/0264553 A1 | 10/2011 | Yarvis et al. | |
| 2011/0264613 A1 | 10/2011 | Yarvis et al. | |
| 2011/0268054 A1 | 11/2011 | Abraham et al. | |
| 2011/0288907 A1* | 11/2011 | Harvey | G06Q 10/0639 705/7.29 |
| 2011/0295719 A1 | 12/2011 | Chen et al. | |
| 2011/0321073 A1 | 12/2011 | Yarvis et al. | |
| 2012/0079521 A1 | 3/2012 | Garg et al. | |
| 2012/0126868 A1 | 5/2012 | Machnicki et al. | |
| 2012/0246000 A1 | 9/2012 | Yarvis et al. | |
| 2012/0246065 A1 | 9/2012 | Yarvis et al. | |
| 2012/0246684 A1 | 9/2012 | Yarvis et al. | |
| 2012/0253920 A1 | 10/2012 | Yarvis et al. | |
| 2012/0304206 A1 | 11/2012 | Roberts et al. | |
| 2013/0013545 A1 | 1/2013 | Agarwal et al. | |

FOREIGN PATENT DOCUMENTS

| | | |
|---|---|---|
| CN | 102316364 A | 1/2012 |
| CN | 102612702 A | 7/2012 |
| EP | 1 003 018 A2 | 5/2000 |
| EP | 1 217 560 A1 | 6/2002 |
| EP | 1 724 992 A1 | 11/2006 |
| EP | 1 939 797 A1 | 7/2008 |
| JP | 10-301905 A | 11/1998 |
| JP | 2000-76304 A | 3/2000 |
| JP | 2000-198412 A | 7/2000 |
| JP | 2002-366550 A | 12/2002 |
| JP | 2004-108865 A | 4/2004 |
| JP | 2004-171343 A | 6/2004 |
| JP | 2004-258872 A | 9/2004 |
| JP | 2006-333531 A | 12/2006 |
| JP | 2006-350813 A | 12/2006 |
| JP | 2007-179185 A | 7/2007 |
| JP | 2007-249413 A | 9/2007 |
| JP | 2008-152564 A | 7/2008 |
| JP | 2008-171418 A | 7/2008 |
| JP | 2008-242805 A | 10/2008 |
| JP | 2008-546075 A | 12/2008 |
| JP | 2009-076041 A | 4/2009 |
| JP | 2009-528639 A | 8/2009 |
| KR | 10-2002-0024645 A | 4/2002 |
| KR | 10-2006-0122372 A | 11/2006 |
| KR | 10-2006-0122375 A | 11/2006 |
| KR | 10-2007-0061601 A | 6/2007 |
| KR | 10-2009-0014846 A | 2/2009 |
| WO | 1999/007148 A1 | 2/1999 |
| WO | 2002/032136 A2 | 4/2002 |
| WO | 2002/032136 A3 | 4/2002 |
| WO | 2002/071298 A1 | 9/2002 |
| WO | 2002/082214 A2 | 10/2002 |
| WO | 2002/082214 A3 | 10/2002 |
| WO | 2006/130258 A2 | 12/2006 |
| WO | 2006/130258 A3 | 12/2006 |
| WO | 2007/101263 A2 | 9/2007 |
| WO | 2008/064071 A2 | 5/2008 |
| WO | 2008/096783 A1 | 8/2008 |
| WO | 2009/002999 A2 | 12/2008 |
| WO | 2009/099876 A2 | 8/2009 |
| WO | 2011/075119 A1 | 6/2011 |
| WO | 2011/075120 A1 | 6/2011 |
| WO | 2011/075137 A1 | 6/2011 |
| WO | 2011/130034 A2 | 10/2011 |
| WO | 2011/130034 A3 | 10/2011 |
| WO | 2011/163411 A2 | 12/2011 |
| WO | 2011/163411 A3 | 12/2011 |
| WO | 2012/006237 A2 | 1/2012 |
| WO | 2012/006237 A3 | 1/2012 |
| WO | 2012/135239 A2 | 10/2012 |
| WO | 2012/135239 A3 | 10/2012 |
| WO | 2013/028204 A1 | 2/2013 |

OTHER PUBLICATIONS

Office Action received for U.S. Appl. No. 13/163,968, dated Nov. 27, 2012, 9 pages.
Final Office Action received for U.S. Appl. No. 13/163,968, dated Apr. 2, 2013, 8 pages.
Office Action received for U.S. Appl. No. 13/163,968, dated Oct. 3, 2013, 8 pages.
Final Office Action received for U.S. Appl. No. 13/163,968, dated Feb. 13, 2014, 8 pges.
Office Action received for U.S. Appl. No. 13/163,984, dated Feb. 28, 2012, 15 pages.
Bindley, Katherine, "Verizon Files Patent for DVR That Watches Viewers, Delivers Targeted Ads Based on What It Sees", The Huffington Post, Published Dec. 5, 2012.
International Search Report and Written Opinion received for PCT Application No. PCT/US2009/068131, dated Sep. 1, 2010, 9 pages.
International Search Report and Written Opinion received for PCT Patent Application No. PCT/US2009/068689, dated Aug. 26, 2010, 11 pages.
International Search Report and Written Opinion received for PCT Patent Application No. PCT/US2009/068129, dated Aug. 31, 2010, 10 pages.
Office Action received for United Kingdom Patent Application No. GB1108772.3, dated Jun. 2, 2011, 2 pages.
Wikipedia, "Nielsen ratings", From Wikipedia, the free encyclopedia, retrieved on Feb. 1, 2013, webpage available at: http://en.wikipedia.org/wiki/Nielsen_ratings, 10 pages.
Schonfeld, Erick "Google Now Lets You Target Ads at Yourself", TechCrunch, posted on Mar. 11, 2009, 2 pages. webpage available at: <http://techcrunch.com/2009/03/11/google-now-lets-you-target-ads-at-yourself/>.
"Introducing Google TV", retrieved on Aug. 17, 2011, 1 page. webpage available at: <http://www.google.com/tv/>.
"Eloda Protocol Suite of Products", retrieved on Aug. 17, 2011, 1 page. webpage available at: <http://www.eloda.com/en/protocol/>.
"TRA—The Right Audience", retrieved on Aug. 17, 2011, 1 page. webpage available at: <http://www.traglobal.com/whatwedo.php>.
Office Action Received for European Patent Application No. 10252181.2, dated Jan. 9, 2012, 4 pages.
European Search Report Received for European Patent Application No. 10252181.2, dated Dec. 23, 2011, 3 pages.
International Preliminary Report on Patentability with Written Opinion received for PCT Patent Application No. PCT/US2012/030776, dated Oct. 10, 2013, 6 pages.
International Search Report and Written Opinion received for International Patent Application No. PCT/US2011/042786, dated Feb. 23, 2012, 8 pages.
International Search Report and Written Opinion received for PCT Patent Application No. PCT/US2011/031064, dated Dec. 14, 2011, 8 pages.
Combined Search and Examination Report received for United Kingdom Application No. 1108772.3, dated Sep. 26, 2011, 5 pages.

(56) References Cited

OTHER PUBLICATIONS

International Search Report and Written Opinion received for PCT Patent Application No. PCT/US2011/041516, dated Feb. 24, 2012, 7 pages.
International Search Report and Written Opinion received for International Patent Application No. PCT/US2011/049228, dated Mar. 27, 2012, 9 pages.
Norio, et al., A prediction system based on Context Information and Operation Histories, vol. 2004, No. 112 Nov. 10, 2004, pp. 83-90. (English Abstract Only).
Office Action received for Japanese Patent Application No. 2012-541060, dated Jun. 18, 2013, 3 pages of Office Action and 3 pages of English Translation.
Office Action Received for the Chinese patent application No. 201010621563.4, dated Mar. 1, 2012, 6 pages of Office Action and 6 pages of English Translation.
Office Action Received for the Japanese Patent Application No. 2010-274870, dated Apr. 3, 2012, 1 page of Office Action and 2 pages of English Translation.
International Preliminary Report on Patentability and Written Opinion received for PCT Application No. PCT/US2009/068131, dated Jun. 28, 2012, 8 pages.
International Preliminary Report on Patentability and Written Opinion received for PCT Patent Application No. PCT/US2009/068129, dated Jun. 28, 2012, 9 pages.
International Preliminary Report on Patentability and Written Opinion received for PCT Application No. PCT/US2009/068689, dated Jun. 28, 2012, 8 pages.
Office Action Received for Japanese Patent Application No. 2011-084230, dated Jul. 17, 2012, 3 pages of Office Action and 3 pages of English Translation.
Yue et al., "Automatic cookie usage setting with CookiePicker", Proceedings of the 37th Annual IEEE/IFIP International Conference on Dependable Systems and Networks, Jun. 2007, pp. 460-470.
International Search Report and Written Opinion received for Patent Application No. PCT/US2012/030776, dated Oct. 29, 2012, 7 pages.
International Preliminary Report and Written Opinion received for PCT Patent Application No. PCT/US2011/031064, dated Oct. 26, 2012, 5 pages.
Office Action Received for the Chinese Patent Application No. 201010621563.4, dated Dec. 25, 2012, 8 pages of Office Action and 10 pages of English Translation.
International Preliminary Report on Patentability and Written Opinion received for PCT Patent Application No. PCT/US2011/042786, dated Jan. 24, 2013, 6 pages.
International Preliminary Report on Patentablitiy and Written Opinion received for PCT Patent Application No. PCT/US2011/041516, dated Jan. 10, 2013, 8 pages.
Matsuo et al., "Finding Social Network for Trust Calculation", National Institute of Advance Industrial Science and technology (AIST), ECAI 2004, 16 pages.
Peter, Mika, "Flink: Semantic Web Technology for the Extraction and Analysis of social Networks", Department of Computer Science, Vrije Universiteit Amsterdam (VUA), De Boelelaan 1081, 1081 HV Amsterdam, The Netherlands, Elsevier Science, May 14, 2005, 20 pages.
McClellan, "Nielsen, Charter in Set-Top Box Deal", Adweek, Mar. 12, 2008, 3 pages.
Norio et al., "Using a Positioning System of Cellular Phone to Learn Significant Locations", IPSJ Journal, Japan, Information Processing Society of Japan, vol. 46, No. 12, Dec. 2005, pp. 2915-2924. (English Abstract Only).
Office Action received for Japanese Patent Application No. 2011-084230, dated Apr. 9, 2013, 2 pages of Office Action including 3 pages of English Translation.
Office Action received for European Patent Application No. 09852385.5, dated Jul. 24, 2012, 2 pages.
Office Action received for Chinese Patent Application No. 201110105727.2, dated May 24, 2013, 8 pages of Office Action and 12 pages of English Translation.
Office Action received for U.S. Appl. No. 13/130,203, dated Mar. 25, 2014, 18 pages.
International Preliminary Report on Patentability and Written Opinion received for PCT Application No. PCT/US2011/049228 dated Mar. 6, 2014, 6 pages.
Office Action received for U.S. Appl. No. 13/162,098, dated Nov. 12, 2013, 14 pages.
Office Action received for Japanese Patent Application No. 2012-541060, dated Feb. 4, 2014, 5 pages of Office Action including 2 page of English Translation.
Office Action received for U.S. Appl. No. 13/163,949, dated Nov. 25, 2013, 22 pages.
Office Action received for U.S. Appl. No. 12/833,035, dated Jun. 6, 2012, 15 pages.
Notice of Allowance received for U.S. Appl. No. 12/833,035, dated Nov. 26, 2012, 10 pages.
Office Action received for U.S. Appl. No. 12/821,376, dated Apr. 10, 2012, 10 pages.
Final Office Action received for U.S. Appl. No. 12/821,376, dated Jul. 17, 2012, 13 pages.
Office Action received for U.S. Appl. No. 12/821,376, dated Apr. 22, 2013, 12 pages.
Final Office Action received for U.S. Appl. No. 12/821,376, dated May 13, 2013, 12 pages.
Office Action received for Chinese Patent Application 201110185034.9, dated May 6, 2013, 13 pages of Office Action including 5 pages of English Translation.
Office Action received for Chinese Patent Application 201110185034.9, dated Jan. 28, 2014, 6 pages of Office Action including 3 pages of English Translation.
Office Action received for United Kingdom Patent Application No. GB1108772.3, dated Apr. 15, 2013, 3 pages.
Office Action received for United Kingdom Patent Application No. GB1108772.3, dated Apr. 1, 2014, 3 pages.
Office Action received for U.S. Appl. No. 13/078,565, dated Oct. 23, 2012, 17 pages.
Office Action received for U.S. Appl. No. 13/078,565, dated Feb. 15, 2013, 19 pages.
Office Action received for U.S. Appl. No. 13/078,565, dated Sep. 11, 2013, 22 pages.
Office Action received for U.S. Appl. No. 13/162,041, dated Feb. 12, 2014, 24 pages.
Davison et al., "Predicting Sequences of User Actions", To be presented at the AAAI/ICML Workshop on Predicting the Future: AI Approaches to Time-Series Analysis, 1998, pp. 1-8.
Tseng et al., "Efficient mining and prediction of user behavior patterns in mobile web systems", Information and Software Technology vol. 48, 2006, pp. 357-369.
Dupret et al., "A user browsing model to predict search engine click data from past observations", SIGIR '08 Proceedings of the 31st annual international ACM SIGIR conference on Research and development in information retrieval, Jul. 20-24, 2008, pp. 331-338.
Office Action received for U.S. Appl. No. 12/761,448, dated Feb. 10, 2012, 12 pages.
Office Action received for U.S. Appl. No. 12/761,448, dated Aug. 1, 2012, 12 pages.
Final Office Action received for U.S. Appl. No. 12/761,448, dated Jan. 31, 2013, 13 pages.
Office Action received for U.S. Appl. No. 13/164,002, dated Dec. 18, 2013, 10 pages.
International Preliminary Report on Patentability and Written Opinion received for PCT Patent Application No. PCT/US2009/068689, dated Jun. 28, 2012, 8 pages.
European Search Report received for EP Patent Application No. 09852397.0, dated Feb. 14, 2014, 6 pages.
Office Action Received for Japanese Patent Application No. 2012-541987, dated Dec. 17, 2013, 6 pages of office action including 3 pages of English Translation.
Office Action received for U.S. Appl. No. 13/129,968, dated Aug. 27, 2012, 19 pages.

(56) References Cited

OTHER PUBLICATIONS

Final Office Action received for U.S. Appl. No. 13/129,968 dated Apr. 4, 2013, 16 pages.
Office Action received for U.S. Appl. No. 13/159,874, dated Sep. 7, 2012, 14 pages.
Final Office Action received for U.S. Appl. No. 13/159,874, dated Apr. 19, 2013, 33 pages.
Office Action received for U.S. Appl. No. 13/159,884, dated Aug. 27, 2012, 19 pages.
Final Office Action received for U.S. Appl. No. 13/159,884, dated May 13, 2013, 32 pages.
Office Action received for U.S. Appl. No. 13/159,894, dated Sep. 11, 2012, 13 pages.
Final Office action Received for U.S. Appl. No. 13/159,894, dated Apr. 25, 2013, 18 pages.
Office Action received for U.S. Appl. No. 13/159,896, dated Sep. 19, 2012, 14 pages.
Final Office action received for U.S. Appl. No. 13/159,896, dated Apr. 24, 2013, 12 pages.
Office Action received for U.S. Appl. No. 13/130,203, dated Mar. 27, 2013, 11 pages.
Final Office Action received for U.S. Appl. No. 13/130,203, dated Nov. 5, 2013, 37 pages.
Extended European Search Report received for EP Patent Application No. 09852385.5, dated Oct. 23, 2013, 7 pages.
Office Action received for Russian Patent Application No. 2012127417, dated Nov. 13, 2013, 5 pages of Office Action including 2 pages of English Translation.
Office Action received for Russian Patent Application No. 2012127417, dated Mar. 11, 2014, 10 pages of Office Action including 4 pages of English Translation.
Office Action received for U.S. Appl. No. 13/161,990, dated Sep. 12, 2012, 9 pages.
Final Office Action Received for U.S. Appl. No. 13/161,990, dated May 16, 2013, 8 pages.
Office Action received for U.S. Appl. No. 13/162,041, dated Oct. 25, 2012, 33 pages.
Final Office Action Received for U.S. Appl. No. 13/162,041, dated Jun. 5, 2013, 26 pages.
Office Action received for U.S. Appl. No. 13/162,098, dated Jan. 10, 2013, 12 pages.
Office Action received for U.S. Appl. No. 13/130,734, dated Mar. 26, 2013, 13 pages.
Final Office Action received for U.S. Appl. No. 13/130,734, dated Aug. 30, 2013, 11 pages.
Extended European Search Report Received for EP Patent Application No. 09852384.8, dated Jan. 3, 2014, 5 pages.
Supplementary European Search Report received for European Patent Application No. 09852384.8, dated Jan. 21, 2014, 1 page.
Office Action received for Japanese Patent Application No. 2012-543075, dated Feb. 12, 2014, 6 pages of Office Action Including 3 pages of English Translation.
Office Action received for Russian Patent Application No. 2012127407, dated Nov. 13, 2013, 16 pages of Office Action including 7 pages of English Translation.
Final Office Action received for U.S. Appl. No. 13/163,949, dated Apr. 21, 2014, 23 pages.
Office Action received for U.S. Appl. No. 13/163,959, dated Feb. 24, 2012, 10 pages.
Final Office Action received for U.S. Appl. No. 13/163,959, dated Jun. 15, 2012, 14 pages.
Office Action received for U.S. Appl. No. 13/163,968, dated Sep. 9, 2011, 8 pages.
Final Office Action received for U.S. Appl. No. 13/163,968, dated Dec. 28, 2011, 7 pages.
Office Action received for U.S. Appl. No. 13/163,968, dated May 4, 2012, 9 pages.

\* cited by examiner

SYSTEM, METHOD AND COMPUTER PROGRAM PRODUCT FOR HUMAN PRESENCE DETECTION BASED ON AUDIO

BACKGROUND

For a number of reasons, it would be useful if a home entertainment device or system were able to determine if people were present in the room. If viewers leave the room in order to go to the kitchen, for example, the system could go into a low power consumption state, perhaps by dimming or powering down the display, or by shutting down completely. In this way, power could be conserved. If recorded media were being viewed, the playback could be automatically paused when a viewer leaves the room.

In addition, the next generation of smart televisions may be service platforms offering viewers several services such as banking, on-line shopping, etc. Human presence detection would also be useful for such TV-based services. For example, if a viewer was accessing a bank/brokerage account using the TV, but then leaves the room without closing the service, a human presence detection capability could be used to automatically log off or shut down the service after a predetermined time. In another case, if another person enters the room while the on-line banking service is running, the human presence detection could be used to automatically turn off the banking service for security or privacy reasons.

Detecting human presence would also be useful to advertisers and content providers. Actual viewership could be determined. Content providers could determine the number of people viewing a program. Advertisers could use this information to determine the number of people who are exposed to a given advertisement. Moreover, an advertiser could determine how many people viewed a particular airing of an advertisement, i.e., how many people saw an ad at a particular time and channel, and in the context of a particular program. This in turn could allow the advertiser to perform cost benefit analysis. The exposure of an advertisement could be compared to the cost to produce the advertisement, to determine if the advertisement, as aired at a particular time and channel, is a worthwhile expense.

BRIEF DESCRIPTION OF THE DRAWINGS/FIGURES

Figure 1:
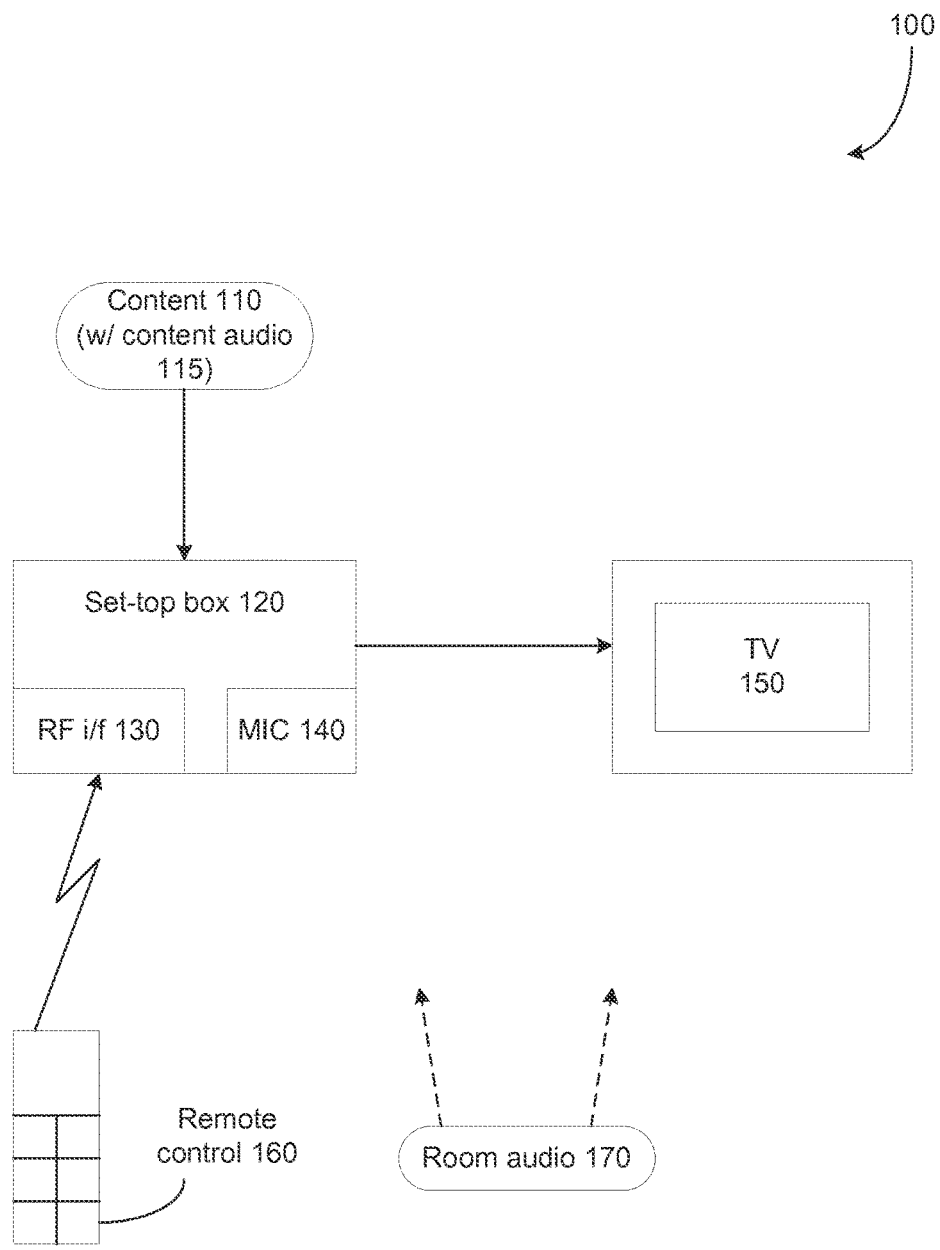
FIG. 1 is a block diagram of an exemplary environment in which embodiments of the systems, methods, and computer products described herein may operate.

In the drawings, the leftmost digits) of a reference number identifies the drawing in which the reference number first appears.

DETAILED DESCRIPTION

An embodiment is now described with reference to the figures, where like reference numbers may indicate identical or functionally related elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems and computer program products that may allow for the determination of human presence in a room where content is being presented. The audio that is associated with the content may be captured, along with the audio that may be being generated in the room by whatever sources are collectively present. Features may be extracted from both the content audio and the room audio. These features may then be compared, and the differences may be quantified. If the differences are significant, then human presence may be inferred. Insignificant differences may be used to infer the absence of people.

The overall context of the system is illustrated in FIG. 1, according to an embodiment. Content 110 may be provided to a user's home entertainment or computer system. In the illustrated embodiment, the content 110 may be received at consumer electronics device such as a set-top box (STB) 120. In alternative embodiments, the content 110 may be received at another consumer electronics device, such as a home computer. The content 110 may be received from a content provider, such as a broadcast network, a server associated with web site, or other source. Content 110 may be received via a data network, and may be communicated through fiber, wired or wireless media, or some combination thereof. In an alternative embodiment, the content 110 may not be received from an external source, but may be locally stored content that can be played by a user. Further, note that content 110 may include an audio component, shown as content audio 115.

Content 110 may be presented to a user through one or more output devices, such as television (TV) 150. The presentation of content 110 may be controlled through the use of a remote control 160, which may transmit control signals to SIB 120. The control signals may be received by a radio frequency (RF) interface WO 130 at STB 120.

Room audio 170 may also be present, including all sound generated in the room. Sources for the room audio 170 may include ambient noise and sounds made by any users, including but not limited to speech. Room audio 170 may also include sound generated by the consumer electronics in the room, such as the content audio 115 produced by TV 150. The room audio may be be captured by a microphone 140. In the illustrated embodiment, microphone 140 may be incorporated in STB 120. In alternative embodiments, the microphone 140 may be incorporated in TV 150 or elsewhere.

Figure 2:
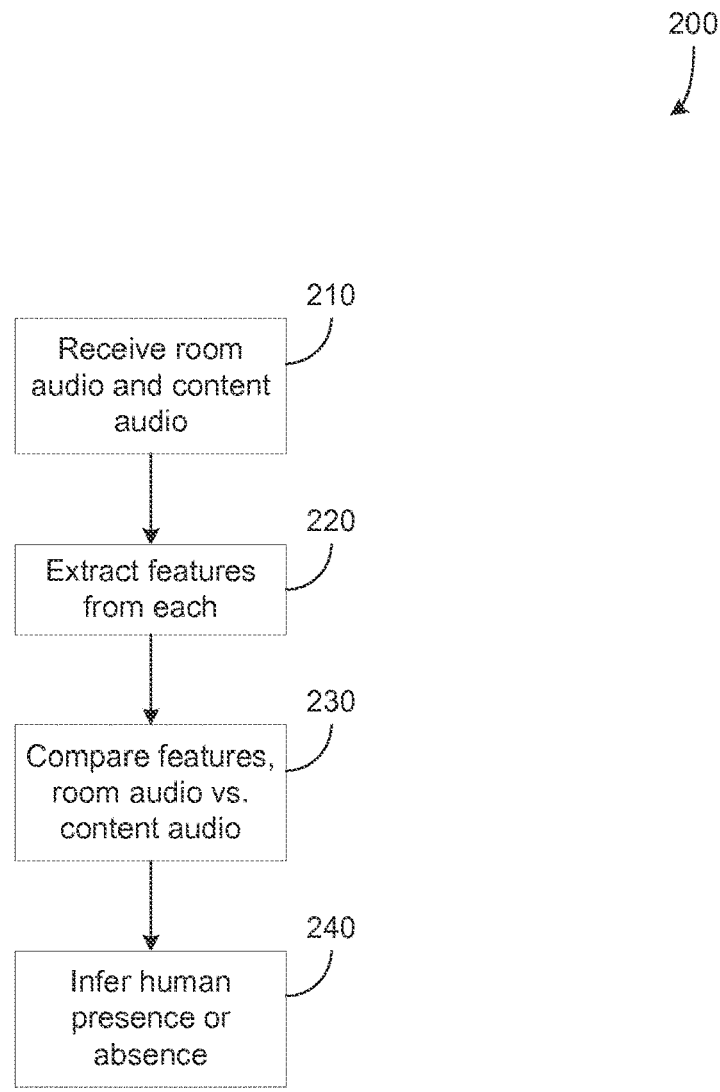
FIG. 2 is a flow chart illustrating the processing of the systems, methods, and computer products described herein, according to an embodiment.

The processing of the system described herein is shown generally at FIG. 2 as process 200, according to an embodiment. At 210, room audio, which includes any content audio as heard in the room, and content audio may be received. In an embodiment, one or both may be recorded, or, in the case of content audio, extracted from the video stream as it is being transmitted in the room, in order to facilitate the processing described below. At 220, analogous features of both room audio and content audio may be extracted. At 230, the extracted features of the room audio may be compared with those of the content audio. At 240, the comparison may be used to infer either the presence or absence of people in the room.

Figure 3:
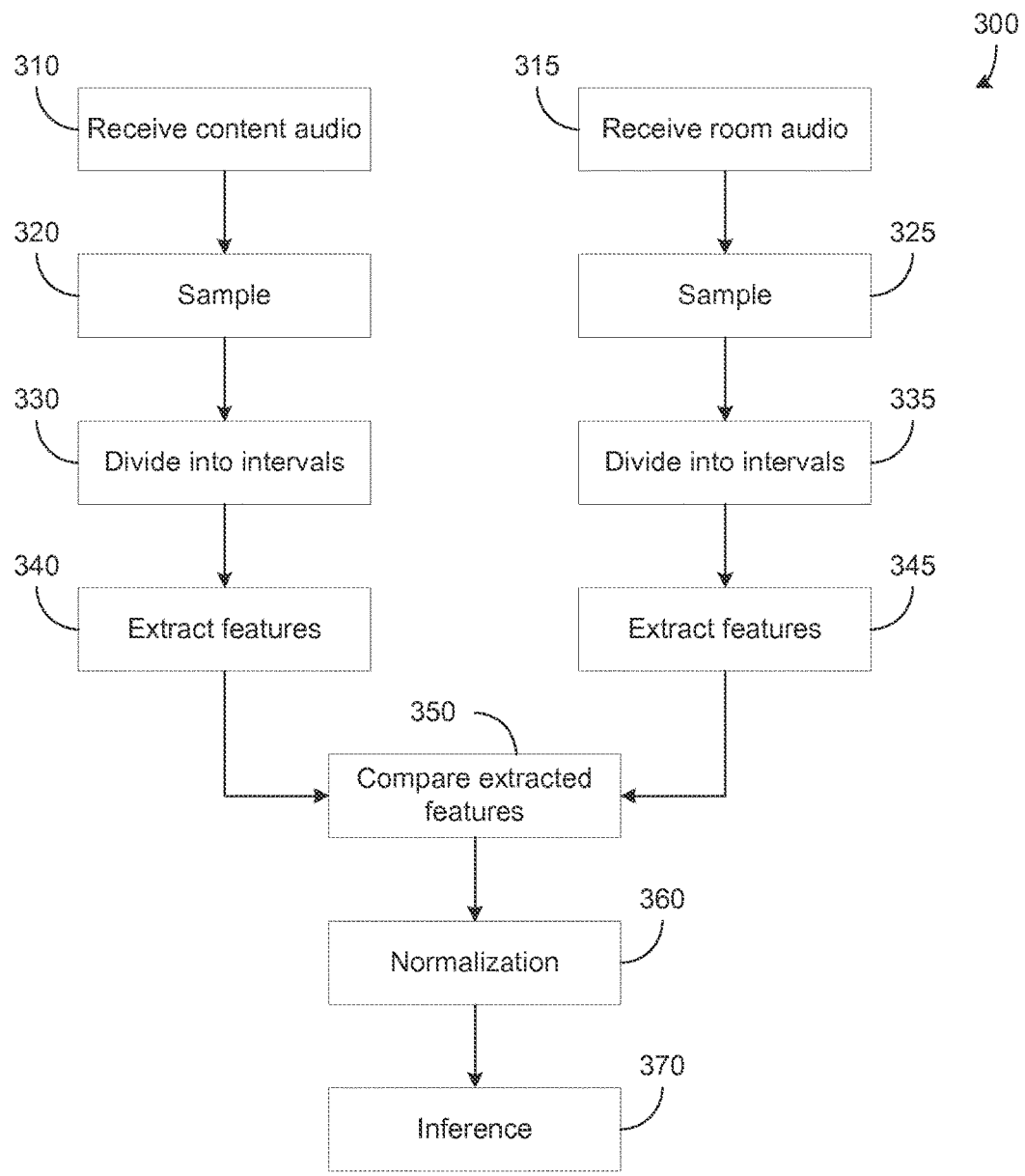
FIG. 3 is a more detailed flow chart illustrating the overall processing of the systems, methods, and computer products described herein, according to an embodiment.

Process 200 is illustrated in greater detail in FIG. 3, according to an embodiment. At 310, content audio may be received. At 320, the content audio may be sampled. In an embodiment, the content audio may be sampled at 8 kHz. In alternative embodiments, the content audio may be sampled at another frequency. At 330, the sampled content audio may be divided into intervals for subsequent processing. In an embodiment, the intervals may be 0.5 second long. At 340, features may be extracted from each interval of sampled content audio. The feature extraction process will be described in greater detail below. Generally, for each interval, a statistical measure may be calculated, such as the coefficient of variation for each interval and used as the feature for subsequent processing.

Room audio may be processed in an analogous manner. At 315, room audio may be received. As noted above, room audio may be captured using a microphone incorporated into an STB or other consumer electronics component in the room, and may then be recorded for processing purposes. At 325, the room audio may be sampled. In an embodiment, the room audio may be sampled at 8 kHz or any other frequency. At 335, the sampled room audio may be divided into intervals for subsequent processing, in an embodiment, the intervals may be 0.5 second long. The intervals of sampled room audio may correspond, with respect to time, to respective intervals of sampled content audio. At 345, features may be extracted from each interval of sampled room audio. As in the case of content audio, a coefficient of variation or other statistical measure may be calculated for each interval and used as the feature for subsequent processing.

At 350, the extracted features may be compared. In an embodiment, this includes comparison of the coefficients of variation as a common statistical measure, for temporally corresponding intervals of sampled room audio and sampled content audio. The comparison process will be described in greater detail below. In an embodiment, this may comprise calculating the difference between the coefficients of variation of the room audio and the content audio, for corresponding intervals. At 360, a normalization or smoothing process may take place. This may comprise calculation of a function of the differences between the coefficients of variation of the room audio and the content audio over a sequence of successive intervals. At 370, an inference may be reached regarding the presence of people in the room, where the inference may be based on the statistic(s) resulting from the normalization performed at 360. In an embodiment, if the coefficients of variation are sufficiently different between temporally corresponding intervals of room and content audio, then the presence of one or more people may be inferred.

Figure 4:
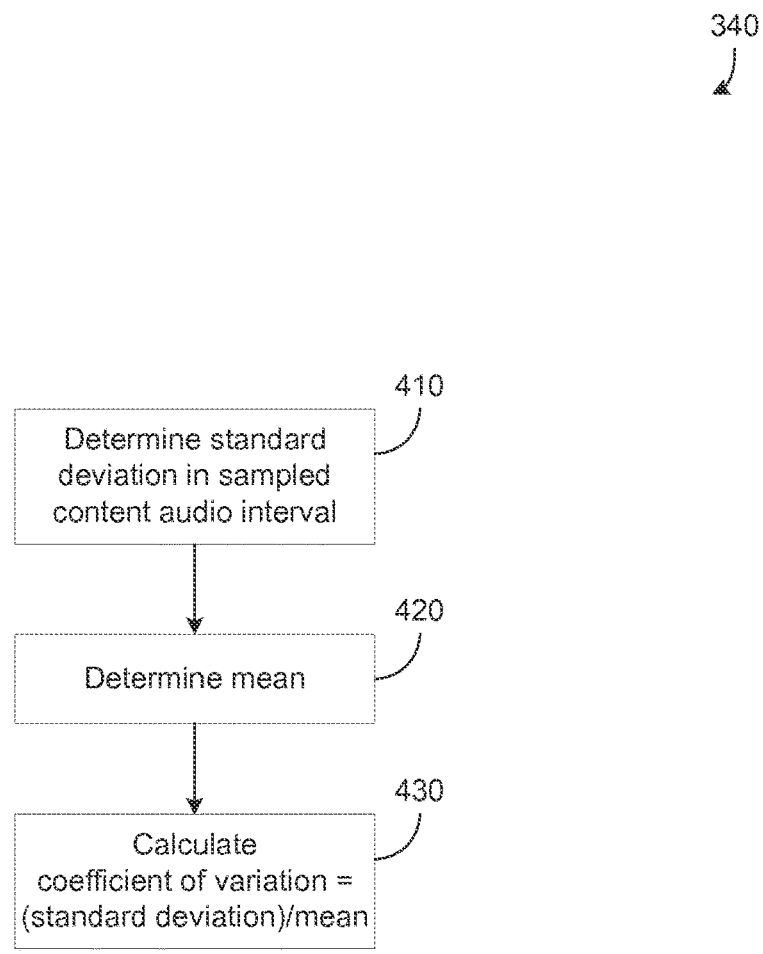
FIG. 4 is a flow chart illustrating feature extraction of content audio, according to an embodiment.

FIG. 4 illustrates an embodiment of the process of feature extraction as may be performed for each interval of sampled content audio. At 410, the standard deviation may be determined for the interval. At 420, the mean may be determined. At 430, the coefficient of variation may be determined, by dividing the standard deviation by the mean, if the mean is not zero; otherwise the coefficient of variation is set to zero.

Figure 5:
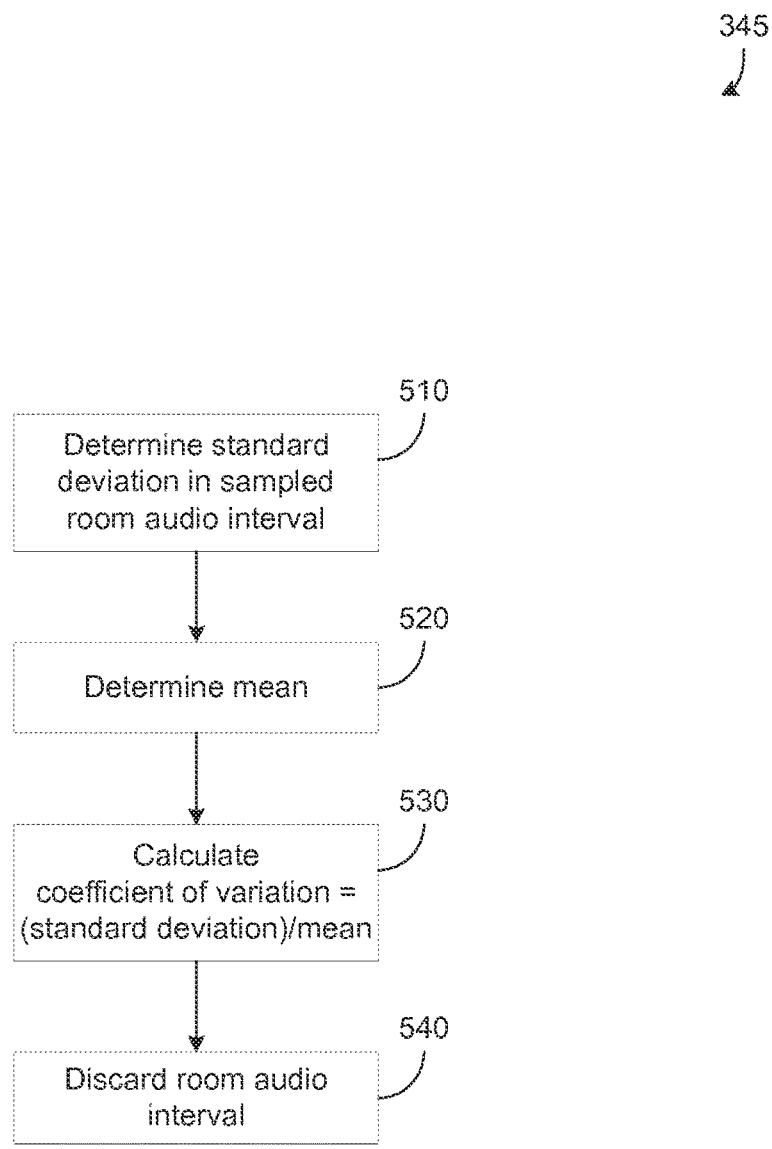
FIG. 5 is a flow chart illustrating feature extraction of room audio, according to an embodiment.

FIG. 5 illustrates the process of feature extraction as may be performed for each interval of sampled room audio, according to an embodiment. At 510, the standard deviation may be determined for the sampled room audio interval. At 520, the mean may be determined. At 530, the coefficient of variation may be determined, by dividing the standard deviation by the mean, if the mean is not zero; otherwise the coefficient of variation is set to zero. At 540, the sampled room audio interval may be discarded. This may serve as a privacy precaution for the one or more persons that may be present in the room.

Figure 6:
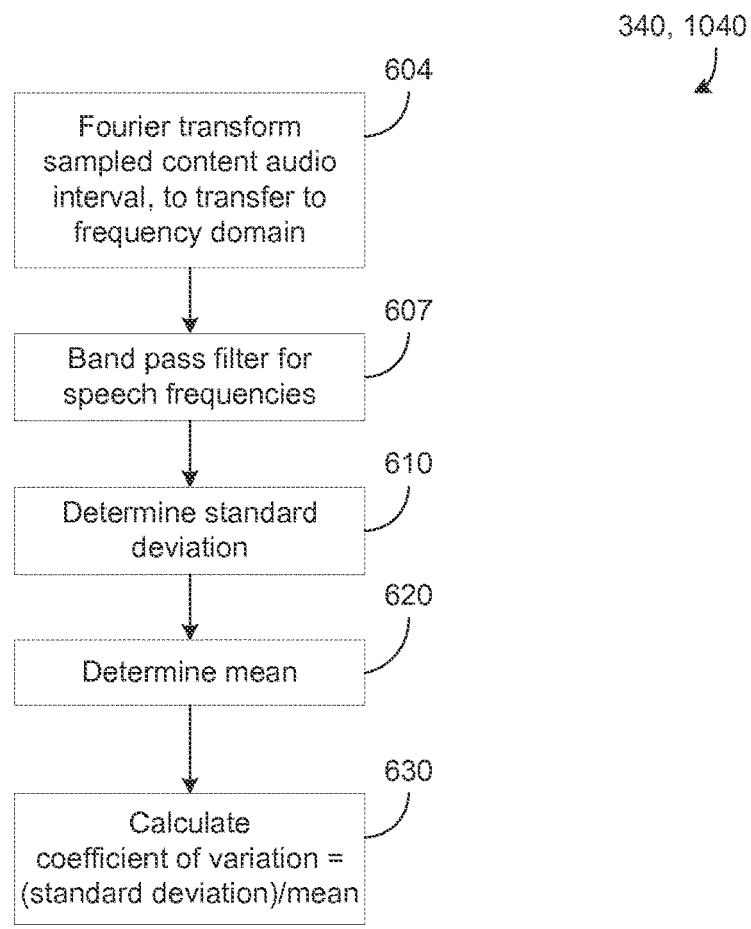
FIG. 6 is a flow chart illustrating feature extraction of content audio in order to determine the presence of more than one person, according to an embodiment.

In an alternative embodiment, additional processing may be performed in conjunction with feature extraction. FIG. 6 illustrates such an embodiment of the process of feature extraction as may be performed for each interval of sampled content audio. At 604, a Fourier transform may be applied to the sampled content audio interval. This may allow the transfer of the signal to the frequency domain. At 607, band pass filtering may be performed, so that common speech frequencies may be retained. In an embodiment, the frequencies 85-1000 Hz may be retained, where speech energy may be most concentrated. At 610, the standard deviation may be determined for the output of 607 for this interval. At 620, the mean may be determined. At 630, the coefficient of variation may be determined, by dividing the standard deviation by the mean, if the mean is not zero; otherwise the coefficient of variation is set to zero.

Figure 7:
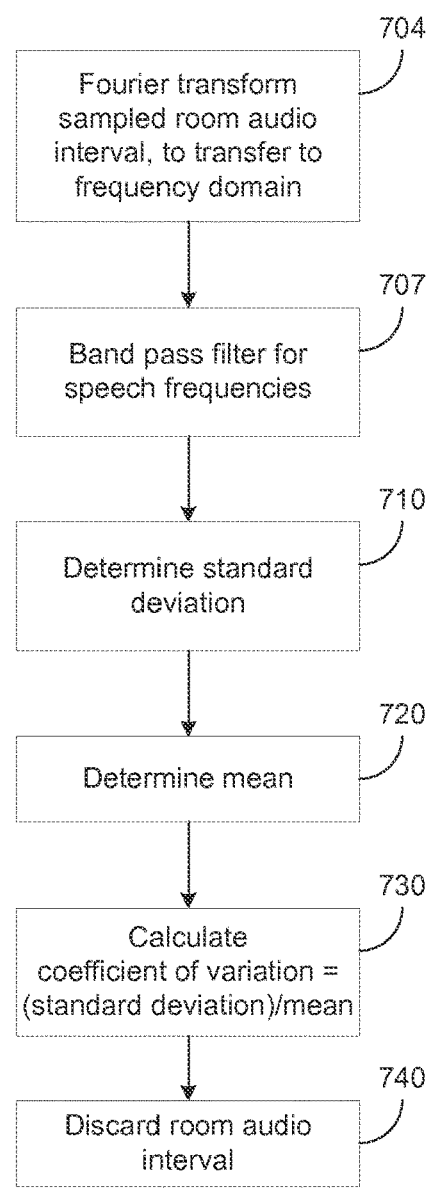
FIG. 7 is a flow chart illustrating feature extraction of room audio in order to determine the presence of more than one person, according to an embodiment.

FIG. 7 illustrates such an embodiment of the process of feature extraction as may be performed for each interval of sampled room audio. At 704, a Fourier transform may be applied to the sampled room audio interval. This may allow the transfer of the signal to the frequency domain. At 707, band pass filtering may be performed, so that common speech frequencies may be retained. As in the process of FIG. 6, the frequencies 85-1000 Hz may be retained, where speech energy may be most concentrated. At 710, the standard deviation may be determined for the output of 707 for this interval. At 720, the mean may be determined. At 730, the coefficient of variation may be determined, by dividing the standard deviation by the mean, if the mean is not zero; otherwise the coefficient of variation is set to zero. At 740, the room audio interval may be discarded.

Figure 8:
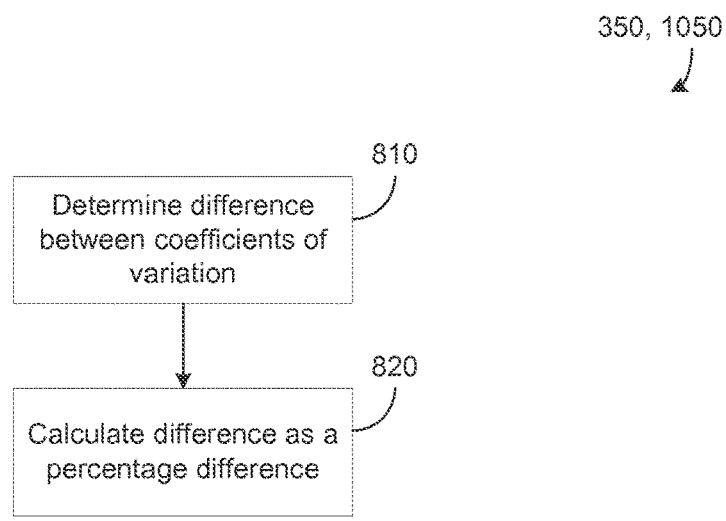
FIG. 8 is a flow chart illustrating the comparison of features of room audio and content audio and the inference of human presence or absence, according to an embodiment.

The comparison of coefficients of variation is illustrated in FIG. 8, according to an embodiment. At 810, for each interval the difference between the coefficients of variation for room audio and for content audio may be determined. In an embodiment, this difference may be expressed as a percentage difference between the two coefficients. At 820, this percentage difference may be calculated. Given a series of content audio intervals and corresponding room audio intervals, the output of 820 may be a series of percentage differences. Each percentage difference may correspond to a pair of time-synchronized intervals, i.e., a content audio interval and a corresponding room audio interval.

Note that the magnitude of the percentage difference may allow greater or lesser confidence in the human presence inference. If the percentage difference is less than the threshold, then human presence may be unlikely, as discussed above. If the percentage is significantly less than the threshold, e.g., close to zero, then this may suggest that the room audio and the content audio are extremely similar, so that a higher degree of confidence may be placed in the inference that human presence is unlikely. Conversely, if the percentage difference exceeds the threshold then human presence may be likely. If the percentage difference exceeds the threshold by a significant amount, then this may suggest that the room audio and the content audio are very different, and a higher degree of confidence may be placed in the inference that human presence is likely.

In an embodiment, the data related to a given interval may be normalized by considering this interval in addition to a sequence of immediately preceding intervals. In this way, significance of outliers may be diminished, while the implicit confidence level of an interval may influence the inferences derived in succeeding intervals. Numerically, the normalization process may use any of several functions. Normalization may use a moving average of data from past intervals, or may use linear or exponential decay functions of this data.

Figure 9:
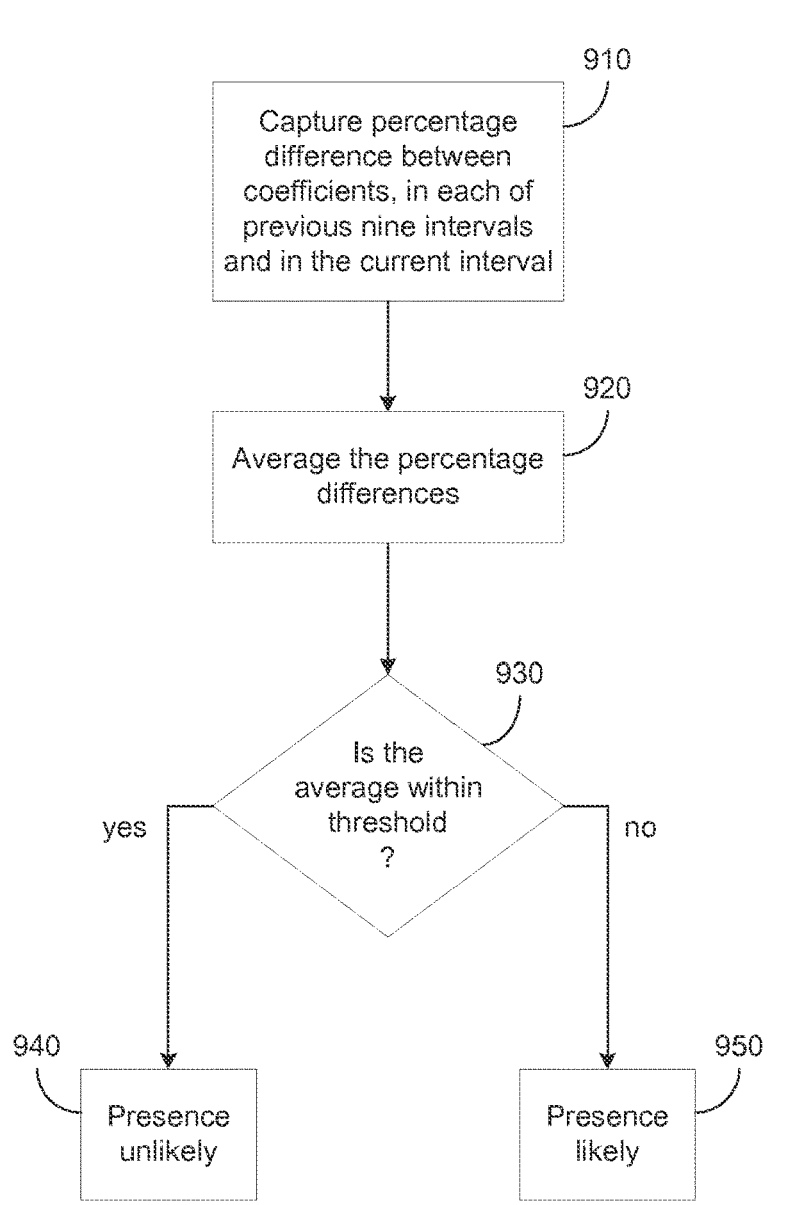
FIG. 9 is a flow chart illustrating the normalization of data and the inference of human presence or absence based on normalized data, according to an embodiment.

FIG. 9 illustrates normalization that may be performed using a moving average, along with subsequent inference, according to an embodiment. Here, a predetermined number of previous intervals may be used. In this embodiment, ten previous intervals may be used. At 910, the percentage difference between coefficients of variation for room audio and content audio for each of the preceding nine intervals may be considered, along with the percentage difference in a current interval. This series of ten values may then be averaged at 920, yielding an average percentage difference. This average percentage difference may then be compared to a threshold value to determine, at 930, if human presence is to be inferred. If the average is within the threshold (e.g., 10% in an embodiment), then at 940 human presence may be unlikely. Otherwise, human presence may be inferred at 950.

The processes of FIGS. 6 and 7 may be used to extract features in the context of determining human presence as shown in FIG. 3 at 340 and 345 respectively. In alternative embodiments these processes may be used in a slightly different manner. Here, the process of FIG. 3 may take place as shown, where feature extraction 340 (for content audio) may take place as shown in FIG. 4, and feature extraction 345 (for room audio) may take place as shown in FIG. 5. If human presence has been inferred at 370, additional processing may be performed to determine if more than one person is present in the room.

Figure 10:
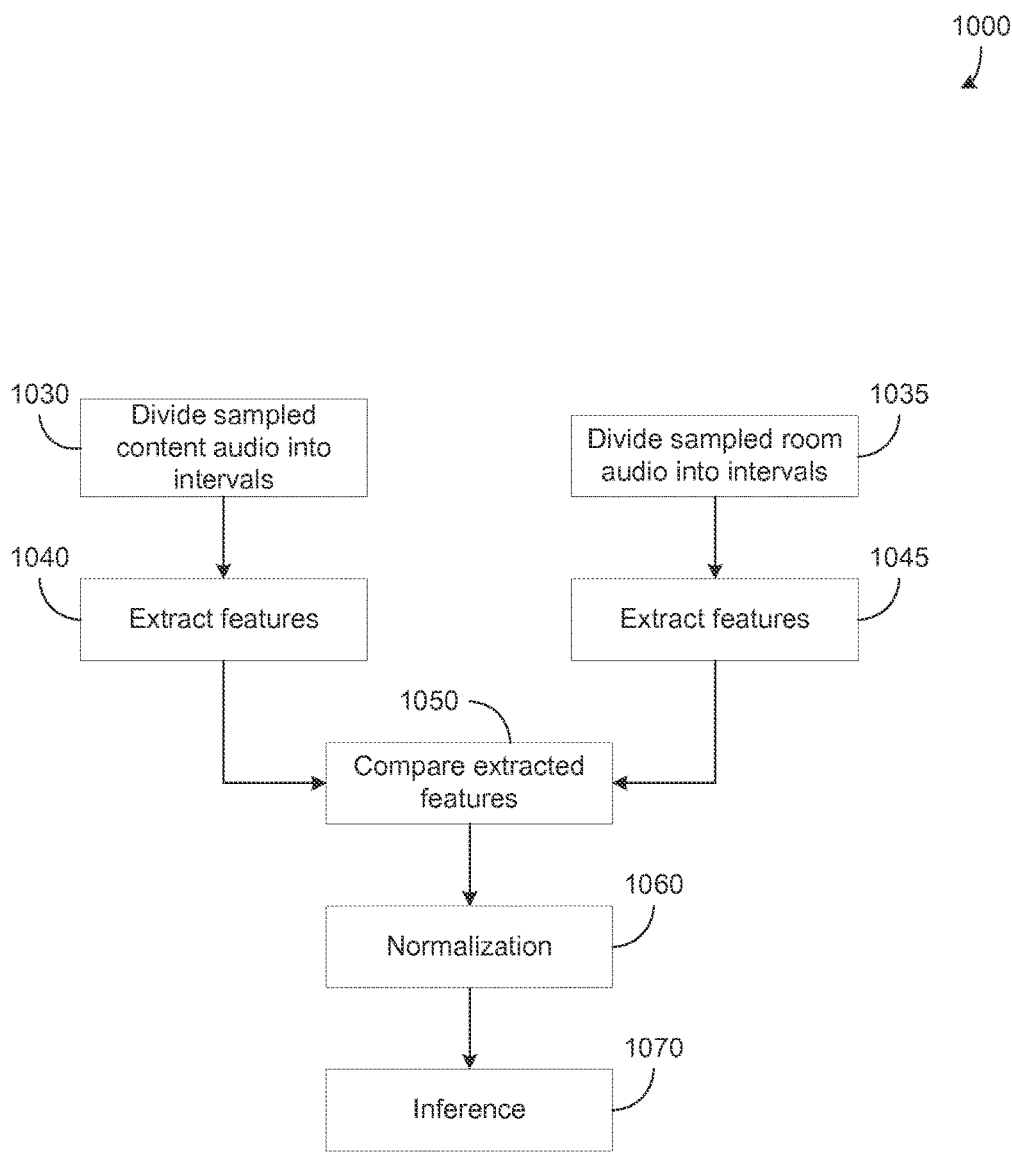
FIG. 10 is a flow chart illustrating the inference of whether more than one person is present room.

This is shown in FIG. 10 according to an embodiment. At 1030, sampled content audio may be divided into intervals. At 1040, features may be extracted for an interval of content audio. In an embodiment, the features of the content audio interval may be extracted according to the process illustrated in FIG. 6 and discussed above. At 1035, sampled room audio may be divided into intervals. At 1045, features may be extracted for an interval of room audio. In an embodiment, the features of the content audio interval may be extracted according to the process illustrated in FIG. 7 and discussed above.

At 1050, the extracted features of a content audio interval and a room audio interval may be compared. This comparison may be performed in the same manner as shown in FIG. 8. At 1060, normalization and inference may be performed in the same manner as shown in FIG. 9. In this case, the inference may be made as to whether the presence of more than one person is likely or unlikely.

As noted above, the systems, methods and computer program products described herein may be implemented in the context of a home entertainment system that may include an STB and/or a smart television, or may be implemented in a personal computer. Moreover, the systems, methods and computer program products described herein may also be implemented in the context of a laptop computer, ultra-laptop or netbook computer, tablet, touch pad, portable computer, handheld computer, palmtop computer, personal digital assistant (PDA), cellular telephone, combination cellular telephone/PDA, smart device (e.g., smart phone, smart tablet or smart television), mobile internet device (MID), messaging device, data communication device, and so forth.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory (RAM), read-only memory (ROM), or other data storage device.

Figure 11:
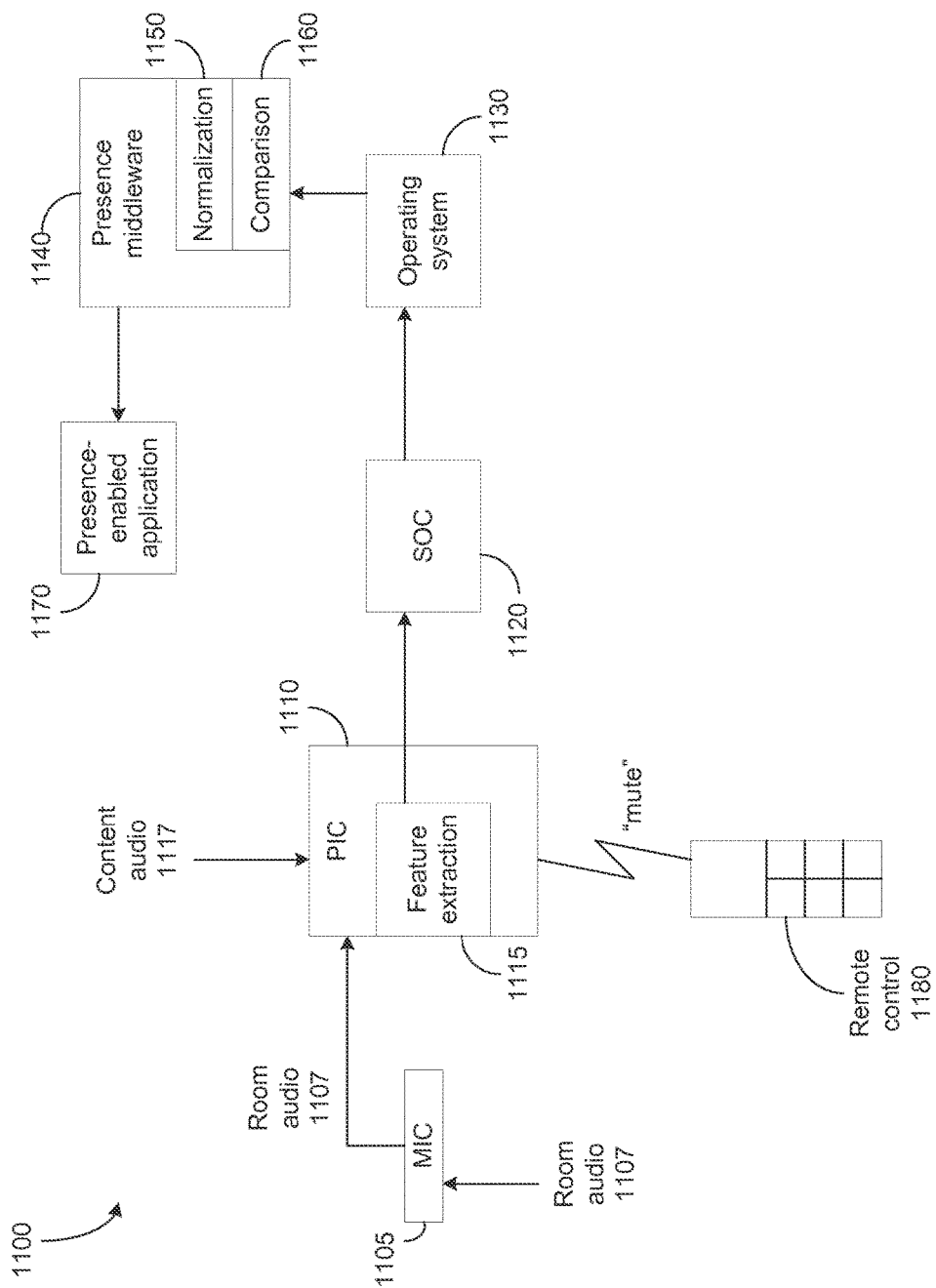
FIG. 11 is a block diagram illustrating the components of a system in which the processing described herein may be implemented, according to an embodiment.

An embodiment of a system that may perform the processing described herein is shown in FIG. 11. Here, the feature extraction may be embodied in firmware in a programmable integrated circuit (PIC). The comparison and normalization processing may be embodied in software.

A microphone 1105 may capture room audio 1107. Content audio 1117 may be received and routed to PIC 1110. The sampling of the room and content audio and the decomposition of these signals into intervals may be performed in PIC 1110 or elsewhere. After sampling and decomposing into intervals, the content and room audio may be processed by the feature extraction firmware 1115 in PIC 1110. As discussed above, feature extraction process may produce coefficients of variation for each interval, for both sampled room audio and sampled content audio. In the illustrated embodiment, feature extraction may take place in the PIC 1110 through the execution of feature extraction firmware 1115. Alternatively, the feature extraction functionality may be implemented in an execution engine of system on a chip (SOC) 1120.

If feature extraction is performed at PIC 1110, the coefficients of variation may be sent to SOC 1120, and then made accessible to operating system (OS) 1130. Comparison of coefficients from corresponding room audio and content audio intervals may be performed by logic 1160 in presence middleware 1140. Normalization may be performed by normalization logic 1150, which may also be part of presence middleware 1140. An inference regarding human presence may then be made available to a presence-enabled application 1170. Such an application may, for example, put system 1100 into a low power state if it is inferred that no one is present. Another example of a presence-enabled application 1170 may be a program that collects presence inferences from system 1100 and others like it in other households, to determine viewership of a television program or advertisement.

As noted above with respect to FIGS. 6, 7 and 10, embodiments may also infer the presence of more than one person. In this case, if human presence is inferred, feature extraction may be repeated using Fourier transformation and bandpass filtering. In an embodiment, this functionality may be implemented in feature extraction firmware 1115. Comparison and normalization may then be performed on the generated coefficients of variation. This processing may be performed by comparison logic 1160 and normalization logic 1150 in middleware 1140.

Items 1105, 1110, 1120, and 1130 may all be located in one or more components in a user's home entertainment system or computer system, in an embodiment. They may be located in an STB, digital video recorder, or television, for example. Presence middleware 1140 and presence-enabled application 1170 may also be located in one or more components of the user's home entertainment system or computer system. In alternative embodiments, one or both of presence middleware 1140 and presence-enabled application 1170 may be located elsewhere, such as the facility of a content provider, for example.

Note that in some embodiments, the audio captured by the microphone 1105 may be muted. A user may choose to do this via a button on remote control 1180 or the home entertainment system. Such a mute function does not interfere with the mute on remote controls which mutes the audio coming out of the TV, A "mute" command for the microphone would then be sent to audio selection logic in PIC 1110. As a result of such a command, audio from microphone 1105 would not be received by OS 1130. Nonetheless, room audio 1107 may still be received at PIC 1110, where feature extraction may be performed. Such a capability may be enabled by the presence of the feature extraction firmware 1115 in the PIC 1110. The statistical data, i.e., the coefficients of variation, may then be made available to the OS 1130, even though the room audio itself has been muted. The nature of the coefficients of variation may be such that the coefficients may not be usable for purposes of recreating room audio 1107.

Figure 12:
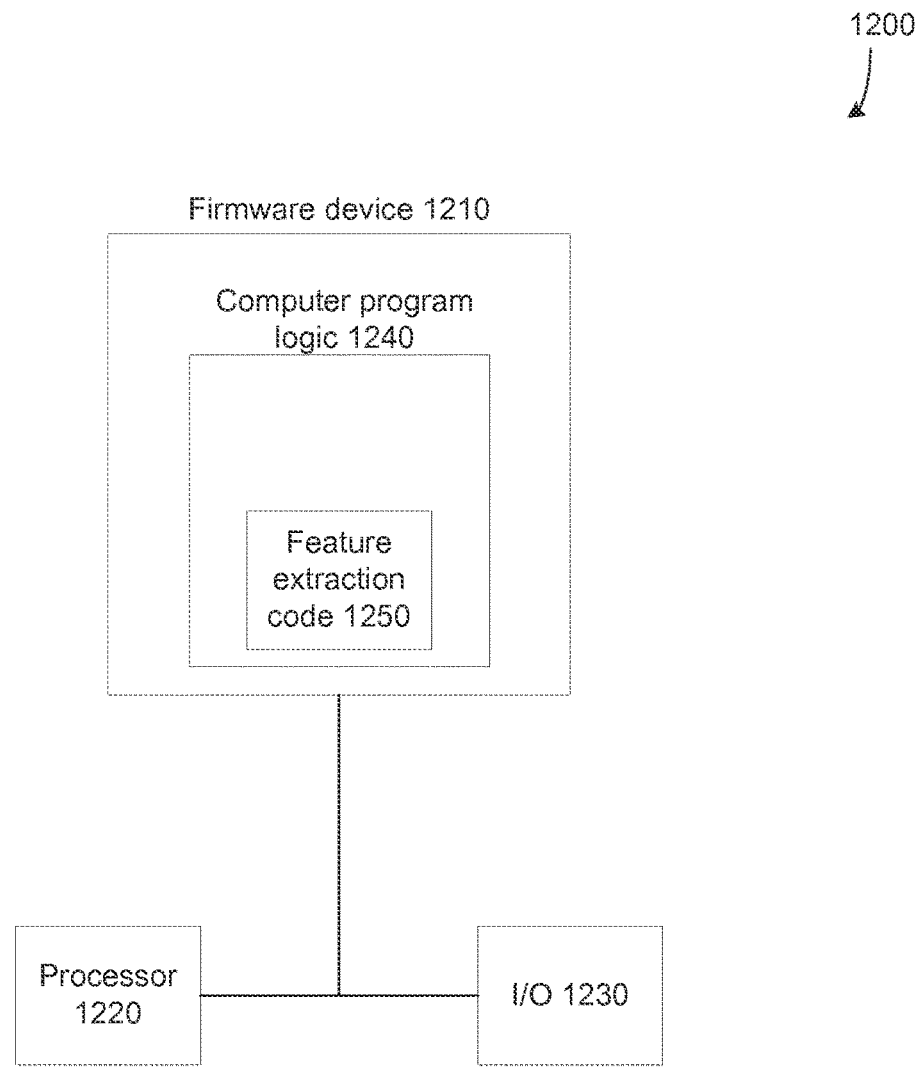
FIG. 12 is a block diagram illustrating the computing context of a firmware embodiment of the feature extraction process, according to an embodiment.

FIG. 12 illustrates an embodiment in which the feature extraction functionality may be embodied in firmware. As discussed above, such functionality may be incorporated as part of a PIC. System 1200 may include a processor 1220 and may further include a firmware device 1210. Device 1210 may include one or more computer readable media that may store computer program logic 1240. Firmware device 1210 may be implemented in a read-only memory (ROM) or other data storage component for example, as would be understood by a person of ordinary skill in the art. Processor 1220 and device 1210 may be in communication using any of several technologies known to one of ordinary skill in the art, such as a bus. Computer program logic 1240 contained in device 1210 may be read and executed by processor 1220. One or more ports and/or I/O components, shown collectively as I/O 1230, may also be connected to processor 1220 and device 1210.

Computer program logic 1240 may include feature extraction code 1250. This code may be responsible for determining the standard deviation and mean for intervals of sampled room audio and content audio, as discussed above. Feature extraction code 1250 may also be responsible for implementing Fourier transformation and bandpass filtering as discussed above with respect to FIGS. 6 and 7. Feature extraction code 1250 may also be responsible for calculation of coefficients of variation for each interval of sampled room and content audio.

Figure 13:
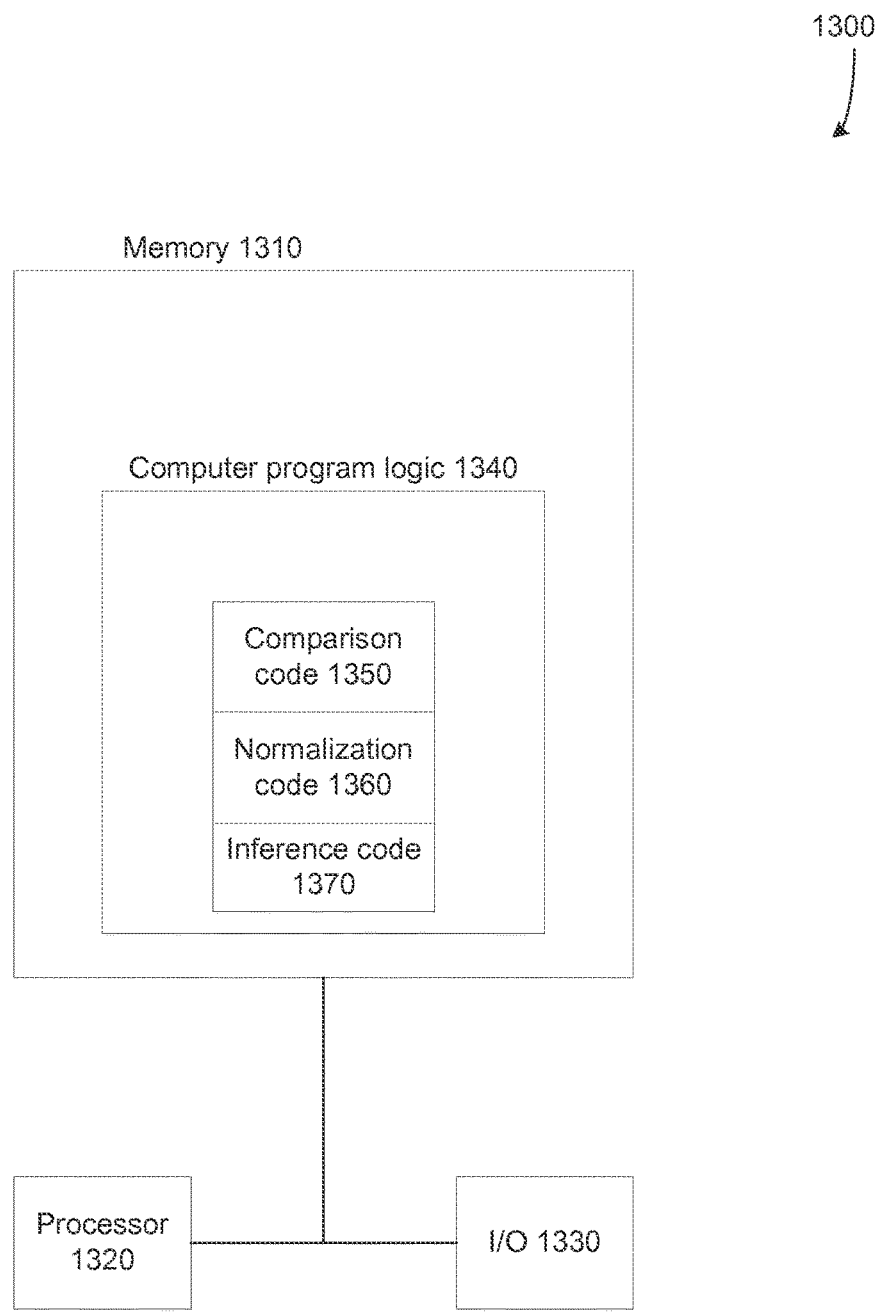
FIG. 13 is a block diagram illustrating the computing context of a software embodiment of the comparison, normalization, and inferences processes, according to an embodiment.

A software embodiment of the comparison and normalization functionality is illustrated in FIG. 13. The illustrated system 1300 may include a processor 1320 and may further include a body of memory 1310. Memory 1310 may include one or more computer readable media that may store computer program logic 1340. Memory 1310 may be implemented as a hard disk and drive, a removable media such as a compact disk, a read-only memory (ROM) or random access memory (RAM) device, for example, or some combination thereof. Processor 1320 and memory 1310 may be in communication using any of several technologies known to one of ordinary skill in the art, such as a bus. Computer program logic 1340 contained in memory 1310 may be read and executed by processor 1320. One or more I/O ports anchor I/O devices, shown collectively as I/O 1330, may also be connected to processor 1320 and memory 1310.

Computer program logic 1340 may include comparison code 1350. This module may be responsible for comparing coefficients of variation of corresponding intervals of room audio and content audio, and generating a quantitative indication of lire difference, e.g., a percentage difference, as discussed above. Computer program logic 1340 may include code 1350 for performing normalization. This module may be responsible for performing normalization of data generated by comparison code 1350 using a moving average or other process, as noted above. Computer program logic 1340 may include inference code 1370. This module may be responsible for generating an inference regarding the presence or absence of people, given the results of normalization code 1360.

The systems, methods, and computer program products described above may have a number of applications. If a viewer leaves a room, for example, the absence of people could be detected as described above, and the entertainment or computer system could go into a low power consumption state, perhaps by dimming or powering down the display, or by shutting down completely. In this way, power could be conserved. If recorded media were being viewed, the playback could be automatically paused when a viewer leaves the room.

In addition, service platforms may offer viewers services such as banking, on-line shopping, etc. Human presence detection as described above would be useful for such TV-based services. For example, if a viewer were accessing a bank/brokerage account using the TV, but then leaves the room without closing the service, a human presence detection capability could be used to automatically log off or shut down the service after a predetermined time. In another case, if another person enters the room while the on-line banking service is running, the human presence detection could be used to automatically turn off the banking service for security or privacy reasons.

Detecting human presence would also be used by advertisers and content providers. Actual viewership could be determined. Content providers could determine the number of people viewing a program. Advertisers could use this information to determine the number of people who are exposed to a given advertisement. Moreover, an advertiser could determine how many people viewed a particular airing of an advertisement, i.e., how many people saw an ad at a particular time and channel, and in the context of a particular program. This in turn could allow the advertiser to perform cost benefit analysis. The exposure of an advertisement could be compared to the cost to produce the advertisement, to determine if the advertisement, as aired at a particular time and channel, is a worthwhile expense.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A machine-implemented method, comprising:
   sampling a content audio from a content;
   sampling room audio from a microphone proximate to a consumer electronics device, the room audio comprising all sounds generated in a room, including the content audio;
   dividing each of the sampled content audio and the sampled room audio into intervals;
   computing a coefficient of variation for each of the intervals of each of the content audio and the room audio, by dividing a standard deviation of the interval by a mean of the interval, if the mean is non-zero;
   comparing the coefficient of variation of each interval of the room audio with the corresponding coefficient of variation of the content audio; and
   determining that a person is present if a difference between the coefficients of variation of a predetermined number of intervals of the content audio and the corresponding coefficients of variation of the room audio exceeds a threshold.

2. The machine-implemented method of claim 1, wherein the determining includes:
   inferring that the person is being exposed to content presented at the consumer electronics device if the difference between the coefficients of variation of the content audio and the coefficients of variation of the room audio exceeds the threshold.

3. The machine-implemented method of claim 1, further including:
   normalizing results of the comparing over the predetermined number of intervals; and performing the determining based on the normalized results of the comparing.

4. The machine-implemented method of claim 3, wherein, for each interval:
   the comparing includes determining a percentage difference between the coefficients of variation of the predetermined number of intervals of the room audio and the corresponding coefficients of variation of the content audio; and
   the normalizing includes averaging the percentage difference of the intervals with the percentage differences of a predetermined number of preceding intervals.

5. The machine-implemented method of claim 1, wherein the computing includes, for each interval of the room audio and the content audio:
   determining the standard deviation of the interval; and
   determining the mean of the interval.

6. The machine-implemented method of claim 1, wherein the determining includes:
   determining a level of confidence that the person is present based upon an extent to which the difference between the coefficients of variation of the content audio and the coefficients of variation of the room audio exceeds the threshold.

7. The machine-implemented method of claim 1, further comprising:
   generating a frequency domain representation of each interval of the room audio and the content audio; and
   wherein:
   the computing includes computing a coefficient of variation of the frequency domain representation of each interval of the content audio and the room audio; and
   the determining includes determining that the person is present if a difference between the coefficients of variation of the predetermined number of intervals of the frequency domain representations of the content audio and the corresponding coefficients of variation of the frequency domain representation of the room audio exceeds the threshold.

8. The machine-implemented method of claim 7, further comprising:
   band pass filtering the frequency domain representation of each interval of the content audio and the room audio to remove frequencies outside of a frequency range of human speech.

9. The machine-implemented method of claim 1, further including:
   placing the consumer electronics device in a reduced power consumption state if the difference between the coefficients of variation of the predetermined number of intervals of content audio and the corresponding coefficients of variation of the room audio is below the threshold.

10. The machine-implemented method of claim 9, further including: pausing presentation of content at the consumer electronics device if the difference between the coefficients of variation of the predetermined number of intervals of the content audio and the corresponding coefficients of variation of the room audio is below the threshold.

11. An apparatus, comprising:
    a programmable integrated circuit (PIC); and
    an execution engine in communication with the PIC;
    wherein the PIC is to:
       sample a content audio from a content;
       sample room audio from a microphone proximate to a consumer electronics device, the room audio comprising all sounds generated in a room, including the content audio;
       divide each of the sampled content audio and the sampled room audio into intervals; and
       compute a coefficient of variation for each interval of each of the content audio and the room audio, by dividing a standard deviation of the interval by a mean of the interval, if the mean is non-zero;
    and wherein the execution engine is to:
       compare each coefficient of variation of the room audio with the corresponding coefficient of variation of the content audio; and
       determine that a person is present if a difference between the coefficients of variation of a predetermined number of intervals of the content audio and the corresponding coefficients of variation of the room audio exceeds a threshold.

12. The apparatus of claim 11, wherein the execution engine is further to:
infer that the person is being exposed to content presented at the consumer electronics device if the difference between the coefficients of variation of the predetermined number of intervals of the content audio and the corresponding coefficients of variation of the room audio exceeds the threshold.

13. The apparatus of claim 11, wherein the execution engine is further to:
normalize results of the comparisons over the predetermined number of intervals; and
determine that the person is present based on the normalized results of the comparisons.

14. The apparatus of claim 13, wherein the execution engine is further to, for each interval of the predetermined number of intervals:
determine a percentage difference between the coefficient of variation of the room audio and the corresponding coefficient of variation of the content audio; and
average the percentage difference of the interval with the percentage differences of a predetermined number of preceding intervals.

15. The apparatus of claim 11, wherein the PIC is further to, for each interval of the room audio and the content audio:
determine the standard deviation of the interval; and
determine the mean of the interval.

16. The apparatus of claim 11, wherein the execution engine is further to:
determine a level of confidence that the person is present based upon an extent to which the difference between the coefficients of variation of the predetermined number of intervals of the content audio and the corresponding coefficients of variation of the room audio exceeds the threshold.

17. The apparatus of claim 11, wherein the PIC is further to:
generate a frequency domain representation of each interval of the room audio and the content audio;
compute the coefficient of variation of each interval of the content audio and the room audio as a coefficient of variation of the respective frequency domain representation; and
the execution engine is further configured to determine that the person is present if a difference between the coefficients of variation of the frequency domain representation of the content audio and the corresponding coefficients of variation of the frequency domain representation of the room audio exceeds the threshold.

18. The apparatus of claim 17, wherein the PIC is further to:
band pass filter the frequency domain representation of each interval of the content audio and the room audio to remove frequencies outside of a frequency range of human speech.

19. The apparatus of claim 11, wherein the execution engine is further to:
place the consumer electronics device in a reduced power consumption state if the difference between the coefficients of variation of each of the predetermined intervals of the content audio and the corresponding coefficients of variation of the room audio is below the threshold.

20. The apparatus of claim 11, wherein the execution engine is further to:
pause presentation of content at the consumer electronics device if the difference between the coefficients of variation of each of the predetermined intervals of the content audio and the corresponding coefficients of variation of the room audio is below the threshold.

21. A non-transitory computer readable media encoded with a computer program that includes instructions to cause a processor to:
sample a content audio from a content;
sample room audio from a microphone proximate to a consumer electronics device, the room audio comprising all sounds generated in a room, including the content audio;
divide each of the sampled content audio and the sampled room audio into intervals;
compute a coefficient of variation for each interval of the content audio and the room audio, by dividing a standard deviation of the interval with a mean of the interval, if the mean is non-zero;
compare the coefficient of variation of each interval of the room audio with the corresponding coefficient of variation of the content audio; and
determine that a person is present if a difference between the coefficients of variation of a predetermined number of intervals of the content audio and the corresponding coefficients of variation of the room audio exceeds a threshold.

22. The non-transitory computer readable media of claim 21, further including instructions to cause the processor to:
infer that the person is being exposed to content presented at the consumer electronics device if the difference between the coefficients of variation of the predetermined number of intervals of the content audio and the corresponding coefficients of variation of the room audio exceeds the threshold.

23. The non-transitory computer readable media of claim 21, further including instructions to cause the processor to:
normalize results of the comparisons over the predetermined number of intervals; and
determine that the person is present based on the normalized results of the comparison.

24. The non-transitory computer readable media of claim 23, further including instructions to cause the processor to, for each interval of the predetermined number of intervals:
determine a percentage difference between the coefficient of variation of the room audio and the coefficient of variation of the content audio; and
average the percentage difference of the interval with the percentage differences of a predetermined number of preceding intervals.

25. The non-transitory computer readable media of claim 21, further including instructions to cause the processor to, for each interval of the room audio and the content audio:
determine the standard deviation of the interval; and
determine the mean of the interval.

26. The non-transitory computer readable media of claim 21, further including instructions to cause the processor to:
determine a level of confidence that the person is present based upon an extent to which the difference between the coefficients of variation of the predetermined number of intervals of the content audio and the corresponding coefficients of variation of the room audio exceeds the threshold.

27. The non-transitory computer readable media of claim 21, further including instructions to cause the processor to:
generate a frequency domain representation of each interval of the room audio and the content audio;
compute the coefficient of variation of each interval of the content audio and the room audio as a coefficient of variation of the respective frequency domain representation; and
determine that the person is present if a difference between the coefficients of variation of the frequency domain representation of the content audio and the corresponding coefficients of variation of the frequency domain representation of the room audio exceeds the threshold.

28. The non-transitory computer readable media of claim 27, further including instructions to cause the processor to: bandpass filter the frequency domain representation of each interval of the content audio and the room audio to remove frequencies outside of a frequency range of human speech.

29. The non-transitory computer readable media of claim 21, further including instructions to cause the processor to: place the consumer electronics device in a reduced power consumption state if the difference between the coefficients of variation of the predetermined number of intervals of the content audio and the corresponding coefficients of variation of the room audio is below the threshold.

30. The non-transitory computer readable media of claim 21, further including instructions to cause the processor to: pause presentation of content at the consumer electronics device if the difference between the coefficients of variation of the predetermined number of intervals of the content audio and the corresponding coefficients of variation of the room audio is below the threshold.

* * * * *